United States Patent
Miyanaga et al.

(10) Patent No.: US 6,872,694 B2
(45) Date of Patent: Mar. 29, 2005

(54) RHEOLOGY CONTROL AGENT

(75) Inventors: Seiichi Miyanaga, Wakayama (JP); Osamu Takiguchi, Wakayama (JP)

(73) Assignee: Kao Corporation, Tokyo (JP)

( * ) Notice: Subject to any disclaimer, the term of this patent is extended or adjusted under 35 U.S.C. 154(b) by 598 days.

(21) Appl. No.: 09/805,040

(22) Filed: Mar. 14, 2001

(65) Prior Publication Data

US 2001/0053752 A1 Dec. 20, 2001

(30) Foreign Application Priority Data

Mar. 16, 2000 (JP) ........................................ 2000-073616
Jul. 27, 2000 (JP) ........................................ 2000-226625

(51) Int. Cl.$^7$ .................... C10M 145/24; C10M 145/00
(52) U.S. Cl. ........................ 508/579; 508/465; 508/555; 508/582
(58) Field of Search ........................................ 508/579

(56) References Cited

U.S. PATENT DOCUMENTS

| | | | | |
|---|---|---|---|---|
| 3,966,625 A | | 6/1976 | Tanizaki et al. | |
| 4,265,774 A | * | 5/1981 | Langdon | 508/579 |
| 4,793,939 A | | 12/1988 | Mori et al. | |
| 5,449,472 A | * | 9/1995 | Egawa et al. | 252/68 |
| 5,494,595 A | * | 2/1996 | Nieh | 508/579 |
| 6,087,307 A | * | 7/2000 | Kaminski et al. | 508/223 |
| 6,239,086 B1 | * | 5/2001 | Hirano et al. | 508/579 |
| 6,417,323 B1 | * | 7/2002 | Miyanaga et al. | 528/425 |
| 6,465,399 B2 | * | 10/2002 | Koishikawa et al. | 508/416 |

FOREIGN PATENT DOCUMENTS

| | | |
|---|---|---|
| EP | 0 370 669 | 5/1990 |
| EP | 1 057 845 | 12/2000 |
| WO | WO 99/42513 | 8/1999 |
| WO | WO 00/77087 | 12/2000 |

* cited by examiner

*Primary Examiner*—Ellen M McAvoy
(74) *Attorney, Agent, or Firm*—Oblon, Spivak, McClelland, Maier & Neustadt, P.C.

(57) ABSTRACT

The present invention provides a method of improving the elastic modulus of oil while maintaining oil flowability. The elastic modulus of oil is significantly increased by the addition of polymers containing polyether groups. The treated oils are useful in products that require oils with both high elastic modulus and fluidity.

22 Claims, No Drawings

RHEOLOGY CONTROL AGENT

TECHNICAL FIELD OF THE INVENTION

The present invention relates to a rheology control agent and an oil composition containing the same.

PRIOR ART

The dynamic modulus (unit: Pa) of a Newtonian fluid is directly proportional to the applied shear rate (unit: rad/second or Hz) and the proportional constant is almost 2. That is, a normal liquid doesn't almost responds to the external forces (strains) with a low (several to several hundreds Hz) frequency, which are commonly found in daily life, though it responds as a high-modulus elastomer to the high-frequency (above several hundreds Hz) forces (strains). Because the dynamic modulus in the former case frequently becomes a small value of an unmeasurable level (lower than 0.01 Pa), the concept of "elasticity of liquid" or "elasticity of liquid composition" has hitherto been a less familiar concept. On the other hand, among concentrated colloidal solutions and concentrated polymer solutions showing a non-Newtonian flow, there are also solutions having an elasticity of a measurable level. However, because these solutions have a high concentration, the viscosity of the solution is usually so high that those solutions show very low fluidity.

DISCLOSURE OF THE INVENTION

An object of the present invention is to solve such a prior fault, further to provide a rheology control agent for oil, which can impart a remarkably high elastic modulus with being sufficiently fluid and to provide an oil composition containing the rheology control agent.

Here, the remarkably high elastic modulus means that, for example, the storage modulus (G' (10%)) of an oil composition having a concentration of 10% by weight at 25° C. under the strain with a frequency of 10 rad/second is improved to at least twice, preferably at least 5 times and more preferably at least 10 times the storage modulus (G' oil) of an oil alone under the same condition.

The present invention provides a method of controlling rheology of oil, comprising adding to the oil a polyether having monomeric units having the formula (I):

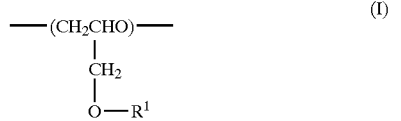

(I)

in which $R^1$ is a hydrogen atom, a hydrocarbon group having 1 to 42 carbon atoms, which may have at least one substituent, or a group of $—(AO)_m—R^2$, $R^2$ being a hydrocarbon group having 1 to 28 carbon atoms, which may have at least one substituent, A being an alkylene group having 2 or 3 carbon atoms, m being a number of 1 to 100, A in the number of m being the same as or different from one another.

In the above-mentioned method, the polyether has preferably a molar fraction of the units (I) in the range between 0.1 and less than 1.0.

It is preferable in the above-mentioned method that the oil is a non-aqueous fluidal liquid at 25° C.

In the above-mentioned method, the polyether is preferably added in an amount of 0.001 to 100 parts by weight per 100 parts by weight of the oil.

Further, the present invention also provides an oil composition comprising oil and the polyether defined above.

Furthermore, the present invention provides use of the polyether defined above as a rheology control agent for oil.

MODES FOR CARRYING OUT THE INVENTION

[Rheology Control Agent]

In the monomeric unit (I), when $R^1$ is a hydrocarbon group, as preferable examples thereof, there are an alkyl or alkenyl group having 1 to 22 carbon atoms, an aryl group having 6 to 14 carbon atoms, and an arylalkyl or alkylaryl group having 7 to 32 carbon atoms. More preferable examples include ethyl group, isopropyl group, n-butyl group, t-butyl group, octyl group, 2-ethylhexyl group, decyl group, dodecyl group, cetyl group, stearyl group, phenyl group, phenethyl group and butylphenyl group.

Also, these hydrocarbon groups may have at least one substituent. The substituent may be hydroxy group, an alkoxy group (1 to 22 carbon atoms), amino group, dimethylamino group, diethylamino group, an amide group (1 to 18 carbon atoms), an alkylammonium group (wherein the alkyl group has 1 to 18 carbon atoms), ammonium group, a methyl ester group, an ethyl ester group, a phenyl ester group, an acyl group (1 to 18 carbon atoms), a silyl group or a halogen atom such as F and Cl (referred to as "the substituent of the present invention" hereinafter).

When $R^1$ is the group shown by $—(AO)_m—R^2$ (wherein $R^2$, A, and m have the same meanings as described above), preferable examples of $R^2$ include methyl group, ethyl group, octyl group and nonylphenyl group. $R^2$ may have a substituent. The substituent includes "the substituent of the present invention". Also, as A, there are exemplified ethylene group and propylene group, and m is preferably from 1 to 50 and more preferably from 3 to 10.

In the rheology control agent of the present invention, there may be plural kinds of the monomeric units (I) having the different $R^1$ and, in this case, the arrangement of those monomeric units along the polyether main chain may be any of block, alternating, periodic and statistical (including random).

The polyether used in the invention can be obtained by the production process which is disclosed in WO 99/42513 published on 26 Aug. 1999, corresponding to EP-A 1057845 published on 6 Dec. 2000.

The rheology control agent of the present invention may be a homopolymer containing the monomeric unit (I) but may be a copolymer as shown by the following formula (II), or may be a graft copolymer shown by the following formula (III-1) or (III-2):

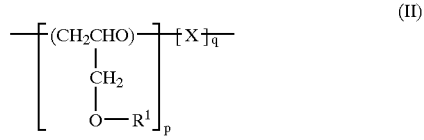

(II)

wherein $R^1$ has the same meaning as described above,

X represents a monomeric unit being copolymerizable with the monomeric unit (I) and being originated from the other monomer, each of p and q represents a repeating number of each of the monomeric units, p is preferably from 10 to 2,000, 000, more preferably from 100 to 2,000,000 and most preferably from 300 to 2,000,000, and q is preferably from 0 to 100,000, but p q is preferable;

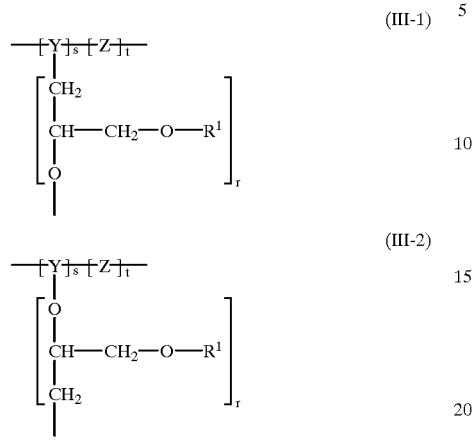

(III-1)

(III-2)

wherein $R^1$ has the same meaning as described above,

Y represents a monomeric unit being capable of linking to the monomeric unit (I), Z represents a monomeric unit being copolymerizable with the monomeric unit Y, each of r, s, and t represents a repeating number of each of the monomeric units, r is preferably from 1 to 1,000,000 and more preferably from 100 to 10,000, s is preferably from 1 to 100,000 and more preferably from 10 to 5,000, t is preferably from 0 to 10,000, and $s \geq t$ is preferable.

When the compound shown by the formula (II) is a copolymer (q≠0), the mode of arrangement of the monomeric unit (I) and X may be any of block, alternating, periodic and statistical (including random).

As the monomeric unit X, there is exemplified a monomeric unit originated from ethylene oxide, a monomeric unit originated from a substituted epoxide other than the monomeric unit (I), or a monomeric unit originated from a monomer other than epoxide which can copolymerize anionically or cationically with epoxides. As the preferable examples, there are monomeric units originated from monomers such as ethylene oxide, propylene oxide, alkylene oxides having 4 to 18 carbon atoms, epichlorohydrin, fluoroalkyl glycidyl ethers, oxetane, lactones, carbonates, lactams, hexamethylcyclotrisiloxane, (meth)acrylates, styrene, butadiene, isoprene, vinyl ethers, carbon dioxide and terminal olefins having 5 to 22 carbon atoms and from derivatives thereof.

In the formula (III-1) or (III-2), the monomeric unit Y may be a group originated from a monomer obtained by any polymerization method such as radical polymerization, anionic polymerization, cationic polymerization and polycondensation, only when the group can carry a polymer unit $-(OCH(CH_2OR^1)CH_2)_r-$ or $-(CH_2CH(CH_2OR^1)O)_r-$. There are exemplified the constructions shown by the following formulae (IV) to (VIII), and polybutadiene, polyisoprene, amorphous polypropylene, polyallylamine, polyethyleneimine, an epoxy resin, polyamide, etc:

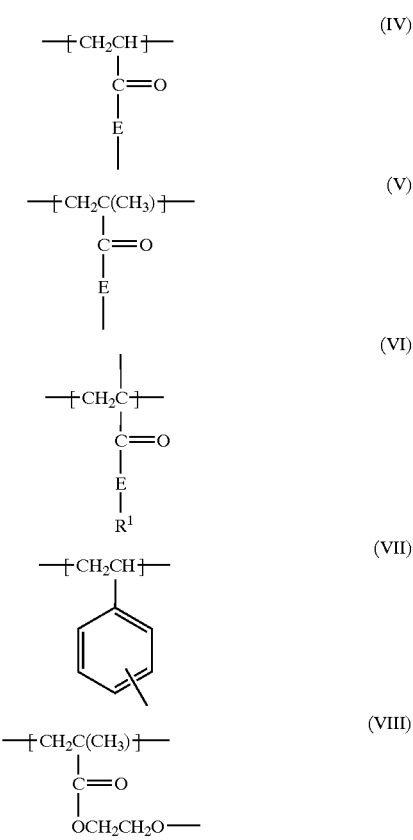

wherein

E represents an oxygen atom or an NH group, and $R^1$ has the same meaning as described above.

In the formula (III-1) or (III-2), when t is not zero, the mode of arrangement of the monomeric units Y and Z may be any of block, alternative, periodic and/or statistical (including random).

The monomeric unit Z may be any monomeric unit being copolymerizable with the monomeric unit Y and being originated from a radical polymerizable, anionic polymerizable or cationic polymerizable monomer. It includes monomeric units originated from monomers such as (meth) acrylic acid esters, styrene, butadiene, isoprene and vinyl ethers.

When the above-described polyether is a copolymer, the copolymer has a molar fraction of the monomeric unit (I) in the range preferably between 0.1 and less than 1.0, more preferably between 0.3 and less than 1.0, and most preferably between 0.5 and less than 1.0.

There is not limited in particular a terminal group of the above-described polyether. However, when the terminal group can be controlled by a synthetic method, for example, the terminal group is preferably a hydrogen atom, a halogen atom, a hydroxy group, an alkyl or alkoxy group having 1 to 22 carbon atoms, an amino group, a dimethylamino group, a diethylamino group, an amide group having 1 to 18 carbon atoms, an acyl group having 1 to 18 carbon atoms, a methyl ester group, an ethyl ester group, a carboxyl group.

The molecular weight of the above-described polyether is preferably from 1,000 to 200,000,000, more preferably from 10,000 to 100,000,000 and most preferably from 30,000 to 50,000,000.

[Oil]

There is not limited in particular the oil in the present invention. There is good any oil which is a non-aqueous fluidal liquid at a room temperature (25° C.) and can dissolve or disperse the rheology control agent of the present invention. For example, it includes (a) hydrocarbons such as toluene, xylene, liquid paraffin, squarane and petroleum ether, (b) alcohols such as ethanol, glycerol and cresol, (c) ethers/ketones such as anisole, dioxane, 1,2-dimethoxyethane, acetone, methyl ethyl ketone and cyclohexanone, (d) esters such as ethyl acetate, isopropyl palmitate, γ-butyrolactones, propylene glycol methyl ether acetate, lactates and ethylene carbonate, (e) halogen/sulfur/nitrogen-containing solvents such as chloroform, trichloroethane, carbon disulfide, dimethyl sulfoxide, acetonitrile, pyridine and nitrobenzene, (f) fats and oils such as a palm oil and an olive oil and the derivatives thereof; (g) silicones. Two or more kinds of these oils may be mixed to be used.

[Oil Composition]

With regard to the blending ratio of the rheology control agent to the oil in the oil composition of the present invention, the rheology control agent is preferably from 0.001 to 100 parts by weight per 100 parts by weight of the oil, preferably from 0.05 to 20 parts by weight in order to obtain a high rheology control faculty with keeping a good fluidity, and more preferably from 0.5 to 15 parts by weight.

Here, the rheology control agents of the present invention may be used singly or in combination of two or more kinds.

The oil composition of the present invention may comprise, in addition to the rheology control agent of the present invention, the other publicly-known rheology control agent, a leveling agent, a dispersant, a surfactant, a coupling agent, and the other additives, and also may comprise a publicly-known polymer other than the polymer shown by the formula (II).

Also, in the oil composition of the present invention, various solid particles or powder insoluble therein can be added into the oil to be used. As the solid particles and powder, there may be exemplified (a) fine particles and powders constituted of inorganic compounds such as silica, titanium oxide, alumina, tin oxide, aluminum hydroxide, magnesium hydroxide and calcium carbonate, gold, silver, copper and aluminum, and further various organic polymers, (b) inorganic pigments and various organic pigments such as red iron oxide, white lead, chrome yellow, iron blue and titanium white, (c) fillers such as carbon black, graphite, carbon whisker, carbon fibers, glass fibers and various clays, (d) various composite material particles. In this case, the particle diameters of these solid particles and powders are properly selected according to the using purposes. Also, the added amount thereof is usually from 0.001 to 200 parts by weight, preferably from 0.05 to 100 parts by weight and more preferably from 1 to 80 parts by weight per 100 parts by weight of the oil.

When the solid particles or powders are added to the oil composition of the present invention, because the elastic modulus of the oil as the medium is very high, the sedimentation resistance of the particles is greatly increased and the stability of the dispersion with the passage of time is remarkably improved.

There is not limited in particular a method for preparing the oil composition of the present invention. That is, the rheology control agent may be added to the oil or the oil may be added to the rheology control agent. Furthermore, in the case of using various additives, the solid particles or powders, the oil may be mixed with the rheology control agent after adding these components to the oil or the rheology control agent may be mixed with the oil after adding to the rheology control agent. Furthermore, these components may be added to the composition after mixing the oil composition. In this case, there is not limited at all the mixing method and optional publicly-known method can be used.

The rheology control agent of the present invention can be effectively used for lubricating oils, engine oils, brake oils, rolling oils, spindle oils, cylinder oils, traction drive oils, suspensions, inks, protective films, shock-absorbing mats, paints, polishing liquids, conductive pastes (or suspensions), color filter photoresists, black matrices, anti-sedimentation agents, electrorheological fluids, laser oscillators, etc.

ADVANTAGEOUS EFFECT OF THE INVENTION

According to the present invention, there can be provided a rheology control agent which can impart a high elastic modulus with keeping fluidity of an oil by adding a small amount thereof as well as an oil composition excellent in the temperature characteristics with a high elastic modulus. The oil composition of the present invention is excellent in the lubricity, the pressure-transmitting property, the shock-absorbing property, the particle dispersibility, the anti-sedimentation property or the like, and can demonstrate the remarkably improved solution characteristics in various fields using oils.

EXAMPLES

Example 1

The elastic modulus of the each solution of the rheology control agents a to g of the present invention and comparative polymers h to j shown below was obtained by the following method.

In addition, the rheology control agents of the present invention and the comparative polymers were measured for the molecular weight using Type GPC 150 C supplied by Waters equipped with columns as Shodex HT-806 and Shodex HT 803 (of two pieces) supplied by Showa Denko K.K. (130° C., o-dichlorobenzene). Also, the number average molecular weight (Mn) is a molecular weight converted to polystyrene basis.

Rheology Control Agent a

Poly(octylglycidyl ether), $R^1$: $C_8H_{17}$, p: 1500, q: 0 and Mn: 250,000 in the formula (II)

Rheology Control Agent b

Poly(n-butylglycidyl ether), $R^1$: $C_4H_9$, p: 4000, q: 0 and Mn: 520,000 in the formula (II)

Rheology Control Agent c

Poly(methylglycidyl ether), $R^1$: $CH_3$, p: 12000, q: 0, Mn: 1,060,000 in the formula (II)

Rheology Control Agent d

2-Ethylhexylglycidyl ether/ethylene oxide copolymer, $R^1$: 2-ethylhexyl, X: $CH_2CH_2O$, p: 1900, q: 480 and Mn: 380,000 in the formula (II)

Rheology Control Agent e

Poly(cetylglycidyl ether), $R^1$: $C_{16}H_{33}$, p: 1200, q: 0 and Mn: 360,000 in the formula (II)

Rheology Control Agent f

Cetylglycidyl ether/hexamethylcyclotrisiloxane copolymer, $R^1$: $c_{16}H_{33}$, X: $Si(CH_3)_2O$, p: 800, q: 150 and Mn: 270,000 in the formula (II)

Rheology Control Agent g

Dodecylglycidyl ether/tridecylglycidyl ether copolymer, $R^1$: $C_{12}H_{25}/C_{13}H_{27}$ (at the compositional ratio of 60/40), p: 2100, q: 0 and Mn: 520,000 in the formula (II)

Comparative polymer h: Polystyrene, Mn: 310,000
Comparative polymer i: Poly(methyl methacrylate), Mn: 280,000
Comparative polymer j: Polydimethylsiloxane, Mn: 900,000

<Method for Measuring the Elastic Modulus>

A xylene solution having 10% by weight of each of the rheology control agents a to g of the present invention and the comparative polymers h to j was prepared and the value of G' (10%)/G' xylene at 25° C. and under the skewness of the frequency of 10 rad/second was calculated. The results are shown in Table 1.

TABLE 1

|  | G' (10%)/G' xylene |
| --- | --- |
| Rheology control agent a | 150 |
| Rheology control agent b | 90 |
| Rheology control agent c | 100 |
| Rheology control agent d | 180 |
| Rheology control agent e | 80 |
| Rheology control agent f | 280 |
| Rheology control agent g | 160 |
| Comparative polymer h | 1.2 |
| Comparative polymer i | 1.1 |
| Comparative polymer j | 1.2 |

Preparation Example 1

By dissolving 10 g of the rheology control agent a in 90 g of liquid paraffin at 60° C. with stirring, an oil composition A was obtained.

Preparation Example 2

By dissolving 3 g of the rheology control agent a in 97 g of isopropyl palmitate at 60° C. with stirring, an oil composition B was obtained.

Preparation Example 3

By dissolving 5 g of the rheology control agent b in 95 g of propylene glycol-1-monomethyl ether-2-acetate (referred to as PGMA hereinafter) at 60° C. with stirring, an oil composition C was obtained.

Preparation Example 4

By dissolving 10 g of the rheology control agent c in 90 g of xylene at 60° C. with stirring, an oil composition D was obtained.

Preparation Example 5

By dissolving 5 g of the rheology control agent d in 95 g of toluene/methyl ethyl ketone/ethyl acetate mixed solution (1/1/1) at 60° C. with stirring, an oil composition E was obtained.

Preparation Example 6

By dissolving 10 g of the rheology control agent e in 90 g of low-viscous polybutene (OH supplied by Idemitsu Petrochemical Co., ltd.) at 60° C. with stirring, an oil composition F was obtained Preparation Example 7

By dissolving 20 g of the rheology control agent f in 80 g of dimethyl silicone oil (6 cs) at 60° C. with stirring, an oil composition G was obtained.

Preparation Example 8

By dissolving 20 g of the comparative polymer h in 80 g of xylene at 60° C. with stirring, an oil composition H was obtained.

Preparation Example 9

By dissolving 5 g of the comparative polymer i in 95 g of toluene/methyl ethyl ketone/ethyl acetate mixed solution (1/1/1) at 60° C. with stirring, an oil composition I was obtained.

Preparation Example 10

By dissolving 10 g of the comparative polymer j in 90 g of dimethyl silicone oil (6 cs) at 60° C. with stirring, an oil composition J was obtained About the oil compositions obtained in the Preparation Examples 1 to 10, the performance thereof was evaluated by the following method.

<Method for Measuring the Viscoelasticity>

Each of the oil compositions A to J was measured in the viscoelasticity using RDA II supplied by Rheometeric Co. Ltd. (with a device having double cylinders). The storage modulus and the viscosity at 25° C. or 60° C. under the frequency of 10 rad/second are shown in Table 2.

TABLE 2

|  | Temperature for measurement (° C.) | Storage modulus (mPa) | Viscosity η (mPa · s) |
| --- | --- | --- | --- |
| Oil composition A | 25 | 2,300 | 1,100 |
| Oil composition B | 25 | 100 | 100 |
| Oil composition C | 25 | 100 | 100 |
| Oil composition D | 25 | 600 | 300 |
| Oil composition E | 25 | 100 | 100 |
| Oil composition F | 60 | 800 | 600 |
| Oil composition G | 25 | 100 | 100 |
| Oil composition H | 25 | 8 | 100 |
| Oil composition I | 25 | 3 | 20 |
| Oil composition J | 25 | 6 | 100 |

The oil compositions A to G added with the rheology control agent of the present invention had a low viscosity, kept a high flowability and showed the storage modulus ten to several hundreds times higher values as compared with the oil compositions H to J added with the comparative polymer.

<Lubricity Test>

Using a bar coater, the oil composition F obtained in Preparation Example 6 was coated on a smooth plate made of stainless steel at a thickness of 50 μm. Applying a load of 3.00 g on a surface area of 2 cm², the lubricity was determined using an apparatus for measuring a surface property manufactured by Heidon Corp. Also, for comparison, only low-viscous polybutene (OH supplied by Idemitsu Petrochemical Co., ltd.) was coated in the same manner and the lubricity was determined. The results are shown in Table 3. By adding the rheology control agent e, the lubricity of the oil composition F was remarkably improved.

TABLE 3

| Coated oil | Index of coefficient of friction |
| --- | --- |
| Oil composition F | 40* |
| Low-viscous polybutene | 100 (standard) |

*The index is shown, provided that the coefficient of friction with (or for) the low-viscous polybutene is made to be 100.

<Stability Test Against Sedimentation of Organic Pigments>

To 50 g of PGMA were added 30 g of copper phthalocyanine (Irgazine Blue X-3367 supplied by Ciba Speciality Chemicals Co., Ltd.) and stirred/pulverized for 30 minutes after adding thereto 50 g of zirconia beads of 1 mm. Thereto were added 50 g of the oil composition C followed by mixing for 3 minutes. Then, by filtering the zirconia beads out, the copper phthalocyanine-containing oil composition was obtained as a homogeneous dark blue liquid. When the liquid was transferred into a precipitating tube and observed with the passage of time, even after 3 months, insoluble aggregated particles were not phase-separated/precipitated.

For comparison, 30 g of copper phthalocyanine were added to 100 g of PGMA, treated in the same manner and transferred to a precipitating tube. After 15 minutes, the phase separation of aggregated particles was observed and, after 6 hours, the particles were sedimented/piled up to the height of about 40% of the liquid amount.

<Stability Test Against Sedimentation of Inorganic Pigments>

To 100 g of the oil composition E were added 50 g of titanium oxide (R-100 supplied by Du Pont) and shaken/mixed after adding thereto 50 g of glass beads of 1 mm. The glass beads were filtered out, the mixed oil thus obtained was transferred to a precipitating tube. After 6 hours, the height of the precipitated layer of titanium oxide stayed at 90% of the liquid amount.

For comparison, using the oil composition I, a titanium oxide-containing oil liquid was obtained in the same manner as above. However, after 20 minutes, a titanium oxide layer was sedimented to the height of 30% of the liquid amount.

<Stability Test of Electroviscous Fluid>

To 100 g of the oil composition G were added 30 g of polystyrene-crosslinked beads coated with tin oxide at a thickness of from 0.1 to 0.4 µm (with the average particle diameter of 5.4 µm) followed by stirring/mixing. When the mixed oil thus obtained was transferred to a precipitating tube and observed with the passage of time, even after 3 months, no separation occurred.

For comparison, using the oil composition J, a tin oxide-covered polystyrene-crosslinked beads-containing oil liquid was obtained by the same manner as above. However, after 3 days, particles were separated/sedimented to the height of 40% of the liquid amount.

What is claimed is:

1. A method of controlling rheology of oil, comprising adding to an oil a polyether having monomeric units having the formula (I):

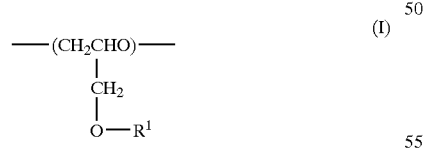

wherein $R^1$ is selected from the group consisting of ethyl, isopropyl, n-butyl, t-butyl, octyl, 2-ethylhexyl, and mixtures thereof, which may have at least one substituent, or a group of $—(AO)_m—R^2$, wherein $R^2$ is a hydrocarbon group having 1 to 28 carbon atoms, which may have at least one substituent, A is an alkylene group having 2 or 3 carbon atoms, m is a number of 1 to 100, and A in the number of m is the same as or different from one another, wherein said oil has an improved elastic modulus and maintains flowability.

2. The method as claimed in claim 1, wherein said polyether has a molar fraction of the units (I) in the range between 0.1 and less than 1.0.

3. The method as claimed in claim 1, wherein said oil is a non-aqueous fluidal liquid at 25° C.

4. The method as claimed in claim 1, wherein said polyether is added in an amount of 0.001 to 100 parts by weight per 100 parts by weight of the oil.

5. An oil composition comprising oil and the polyether as defined in claim 1.

6. A method as claimed in claim 1 wherein $R^1$ is selected from the group consisting of ethyl, isopropyl, n-butyl, t-butyl and mixtures thereof.

7. A method of controlling rheology of oil, comprising adding to an oil a copolymer having the formula (II):

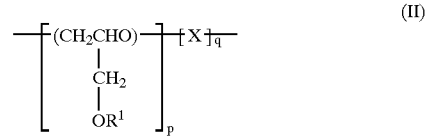

wherein $R^1$ is a hydrogen atom, a hydrocarbon group having 1 to 42 carbon atoms, which may have at least one substituent, or a group of $—(AO)_m—R^2$, wherein $R^2$ is a hydrocarbon group having 1 to 28 carbon atoms, which may have at least one substituent, A is an alkylene group having 2 or 3 carbon atoms, m is a number of 1 to 100, A in the number of m is the same as or different from one another, p is 10 to 2,000,000 and q is 0 to 100,000, where X is a monomeric unit that is copolymerizable with the monomeric unit (I) and wherein said oil has an improved elastic modulus and maintains flowability.

8. A method as claimed in claim 7 wherein X is selected from the group consisting of ethylene oxide, propylene oxide, alkylene oxides having 4 to 18 carbon atoms, epichlorohydrin, fluoroalkyl glycidyl ethers, oxetane, lactones, carbonates, lactams, hexamethylcyclotrisiloxane, acrylates, methacrylates, styrene, butadiene, isoprene, vinyl ethers, carbon dioxide, terminal olefins having 5 to 22 carbon atoms and mixtures thereof.

9. A method of controlling rheology of oil comprising adding to an oil a copolymer having the formula (III-1):

where Y is a monomeric unit that can copolymerize with the monomer unit of Formula (I); and Z is a monomeric unit that can copolymerize with the monomeric unit Y;

U is $—CH_2CH(CH_2—O—R^1)—O—$ or $—O—CH(CH_2—O—R^1)—CH_2—$; and $R^1$ is a hydrogen atom, a hydrocarbon group having 1 to 42 carbon atom, which may have at least one substituent, or a group of $—(AO)_m—R^2$, wherein $R^2$ is a hydrocarbon group having 1 to 28 carbon atoms, which may have at least one substituent, A is an alkylene group having 2 or 3 carbon atoms, m is a number of 1 to 100, A in the number of m is the same as or different from one another, r is 1 to 1,000,000, s is 1 to 100,000 and t is 0 to 10,000 and wherein said oil has an improved elastic modulus and maintains flowability.

10. A method as claimed in claim 9 wherein Y is at least one monomeric unit selected from the group consisting of polybutadiene, polyisoprene, amorphous polypropylene, polyallylamine, polyethyleneimine, an epoxy resin, polyamide, compounds of

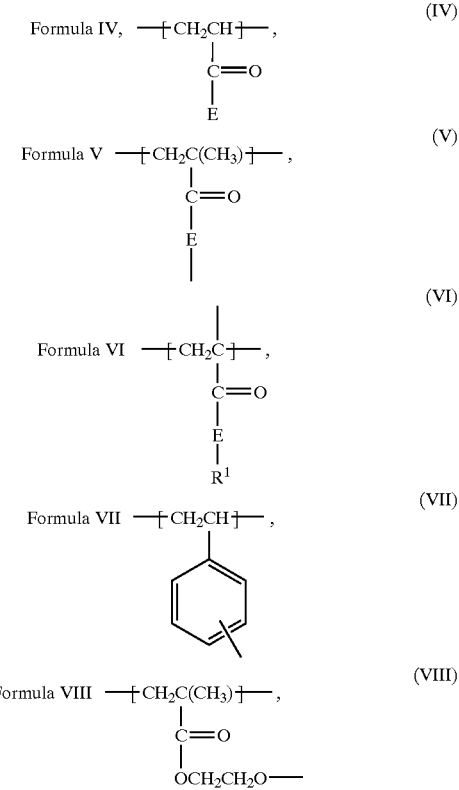

and mixtures thereof, and
wherein E is an oxygen atom or an NH group and wherein Z is a monomeric unit selected from the group consisting of acrylic acid esters, methacrylic acid esters, styrene, butadiene, isoprene, vinyl ethers and mixtures thereof.

11. A method as claimed in claim 1 wherein the storage modulus of said oil is increased by at least a factor of two.

12. A method as claimed in claim 7 wherein the storage modulus of said oil is increased by at least a factor of two.

13. A method as claimed in claim 9 wherein the storage modulus of said oil is increased by at least a factor of two.

14. A method as claimed in claim 1 wherein said oil is selected from the group consisting of, hydrocarbons, toluene, xylene, liquid paraffin, squarane, petroleum ether, alcohols, ethanol, glycerol, cresol, ethers, ketones, anisole, dioxane, 1,2-dimethoxyethane, acetone, methyl ethyl ketone, cyclohexanone, esters, ethyl acetate, isopropyl palmitate, γ-buytrolactones, propylene glycol methyl ether acetate, lactates, ethylene carbonate, chloroform, tricholoroethane, carbon disulfide, dimethyl sulfoxide, acetonitrile, pyridine, nitrobenzene, fats, oils, palm oil, olive oil, silicone oils, silicones and mixtures thereof.

15. A method as claimed in claim 7 wherein said oil is selected from the group consisting of, hydrocarbons, toluene, xylene, liquid paraffin, squarane, petroleum ether, alcohols, ethanol, glycerol, cresol, ethers, ketones, anisole, dioxane, 1,2-dimethoxyethane, acetone, methyl ethyl ketone, cyclohexanone, esters, ethyl acetate, isopropyl palmitate, γ-buytrolactones, propylene glycol methyl ether acetate, lactates, ethylene carbonate, chloroform, tricholoroethane, carbon disulfide, dimethyl sulfoxide, acetonitrile, pyridine, nitrobeuzene, fats, oils, palm oil, olive oil, silicone oils, silicones and mixtures thereof.

16. A method as claimed in claim 9 wherein said oil is selected from the group consisting of, hydrocarbons, toluene, xylene, liquid paraffin, squarane, petroleum ether, alcohols, ethanol, glycerol, cresol, ethers, ketones, anisole, dioxane, 1,2-dimethoxyethane, acetone, methyl ethyl ketone, cyclohexanone, esters, ethyl acetate, isopropyl palmitate, γ-buytrolactones, propylene glycol methyl ether acetate, lactates, ethylene carbonate, chloroform, tricholoroethane, carbon disulfide, dimethyl sulfoxide, acetonitrile, pyridine, nitrobenzene, fats, oils, palm oil, olive oil, silicone oils, silicones and mixtures thereof.

17. The method as claimed in claim 7 wherein said oil is a non-aqueous fluidal liquid at 25° C.

18. The method as claimed in claim 7 wherein said copolymer is added in an amount of 0.001 to 100 parts by weight per 100 parts by weight of the oil.

19. An oil composition comprising oil and the copolymer as defined in claim 7.

20. The method as claimed in claim 9 wherein said oil is a non-aqueous fluidal liquid at 25° C.

21. The method as claimed in claim 9 wherein said copolymer is added in an amount of 0.0001 to 100 parts by weight per 100 parts by weight of the oil.

22. An oil composition comprising oil and the copolymer as defined in claim 9.

* * * * *